US008947377B2

(12) United States Patent
Van Antwerpen et al.

(10) Patent No.: US 8,947,377 B2

(45) Date of Patent: Feb. 3, 2015

(54) SYSTEM AND METHOD FOR SYNCHRONIZATION OF TOUCH PANEL DEVICES

(75) Inventors: Hans Van Antwerpen, Mountain View, CA (US); Scott Swindle, Cardiff by the Sea, CA (US); Aaron Hogan, Ballincollig (IE); Paul Kelleher, Aherla (IE)

(73) Assignee: Cypress Semiconductor Corporation, San Jose, CA (US)

( * ) Notice: Subject to any disclaimer, the term of this patent is extended or adjusted under 35 U.S.C. 154(b) by 378 days.

(21) Appl. No.: 13/238,242

(22) Filed: Sep. 21, 2011

(65) Prior Publication Data

US 2012/0256852 A1 Oct. 11, 2012

Related U.S. Application Data

(60) Provisional application No. 61/472,603, filed on Apr. 6, 2011.

(51) Int. Cl.
*G06F 3/041* (2006.01)

(52) U.S. Cl.
CPC .................................... *G06F 3/0416* (2013.01)
USPC ........................................... 345/173; 345/1.1

(58) Field of Classification Search
CPC ..... G06F 3/044; G06F 3/1446; G06F 3/1423; G06F 3/1438; G06F 3/0416; G06F 1/04; G06F 1/10; G06F 1/12
USPC .................................................. 345/173, 1.1
See application file for complete search history.

(56) References Cited

U.S. PATENT DOCUMENTS

| | | | | |
|---|---|---|---|---|
| 5,949,262 | A | 9/1999 | Dreps et al. | |
| 7,643,011 | B2 | 1/2010 | Westerman | |
| 7,848,825 | B2 | 12/2010 | Wilson et al. | |
| 2003/0137528 | A1 | 7/2003 | Wasserman et al. | |
| 2008/0158172 | A1 | 7/2008 | Hotelling et al. | |
| 2008/0158177 | A1* | 7/2008 | Wilson et al. | 345/173 |
| 2009/0070692 | A1 | 3/2009 | Dawes et al. | |
| 2009/0251430 | A1* | 10/2009 | Hung et al. | 345/173 |
| 2010/0059295 | A1 | 3/2010 | Hotelling et al. | |
| 2010/0283760 | A1* | 11/2010 | Leung et al. | 345/174 |
| 2011/0018837 | A1 | 1/2011 | Chen et al. | |
| 2011/0122088 | A1* | 5/2011 | Lin et al. | 345/174 |
| 2012/0054379 | A1* | 3/2012 | Leung et al. | 710/23 |
| 2012/0056822 | A1* | 3/2012 | Wilson et al. | 345/173 |

OTHER PUBLICATIONS

Atmel Corporation, "Introducing Atmel maXTouch mXT768E"; 2 pages.

EE Herald, "SPI Bus Interface", 6 pages.

(Continued)

*Primary Examiner* — Lixi C Simpson

(74) *Attorney, Agent, or Firm* — Lowenstein Sandler LLP

(57) ABSTRACT

A system and method for synchronization of touch-panel devices is described. In one embodiment, the system includes a first controller device configured to control operations of a first portion of a touch-panel device such that the first controller device is further configured to generate a single master timing signal. The single master timing signal is configured to synchronize operation of the first controller device and a second controller device that is configured to control operations of a second portion of a touch-panel device.

20 Claims, 10 Drawing Sheets

203
205
304
MASTER CHIP
SLAVE CHIP
CLOCK SOURCE
UDB/DSI
306
308
305
I2C/SPI (HOST)
I2C/SPI SLAVE
I2C/SPI MASTER
I2C/SPI SLAVE
205
CLOCK SOURCE
206
TIMING GENERATOR
IO
EXTSYNC
IO
204
TSS
307
310
TSS
204
TXRX SEQUENCER STATE MACHINE
EXTERNAL NOISE DETECTOR
INTERNAL NOISE DETECTOR
MULTI-CHIP SYNCH
EXTERNAL NOISE DETECTOR
INTERNAL NOISE DETECTOR
MULTI-CHIP SYNCH
TXRX SEQUENCER STATE MACHINE
EXTREJECT
310
303

(56) References Cited

OTHER PUBLICATIONS

International Search Report for International Application No. PCT/US11/67121 dated Apr. 13, 2012; 2 pages.
John Carey, "Getting in Touch with Capacitance Sensor Algorithms", dated Sep. 9, 2009; 8 pages.
Productivity Engineering GmbH, "PE5004 Capacitive Sensor Matrix Control IC", dated Jul. 2010; 2 pages.
Written Opinion of the International Searching Authority for International Application No. PCT/US11/67121 dated Apr. 13, 2012; 5 pages.

* cited by examiner

SYSTEM AND METHOD FOR SYNCHRONIZATION OF TOUCH PANEL DEVICES

RELATED APPLICATIONS

This application claims the benefit of Provisional Application No. 61/472,603, filed on Apr. 6, 2011, the entire contents of which are hereby incorporated by reference.

TECHNICAL FIELD

This disclosure relates to field of touch-panel applications; and in particular, relates to synchronization of touch-panel controller devices.

BACKGROUND

There is a general demand for Liquid Crystal Display devices to have better signal-to-noise ratio and faster refresh rates in the touch-screen market today. In addition, screen sizes of such devices are frequently increasing as demanded by the market. A commonly recognized solution to this problem is the provision of multiple touch-panel controllers into integrated circuits (commonly referred to as "chips") on a single circuit board or generally across multiple locations, for example, within a single computing device such as mobile phone or tablet pad. However, these multiple touch-panel controllers often do not synchronize together thus creating problems such as rejection of conversions/sub-conversions during processing of a user using the screen as described herein.

There are conventional solutions that attempt to solve the problem of synchronization of the multiple touch-panel controllers. One such approach is to drive all the touch-panel controllers with a common clock. A problem with this approach is that it requires an accurate stable clock that must be maintained over a distance for the multiple touch-panel controllers. However, the clock may be subjected to noise and interference which generate the same for other devices on the same circuit board, for example on a mobile phone. Another approach is to reduce the clock frequency of a master controller device by a particular integer divisor to generate a synchronization (synch) signal. The master controller device sends the synch signal to a slave controller device, and the slave controller device multiplies the synch signal by a corresponding integer multiple upon arrival at the slave controller device. However, this is a costly solution as it requires a tremendous amount of power and area on the circuit board and further requires an additional signal to phase align the master and slave controller devices.

BRIEF DESCRIPTION OF THE DRAWINGS

The present invention is illustrated by way of example, and not of limitation, in the figures of the accompanying drawings in which.

DETAILED DESCRIPTION

Figure 1:
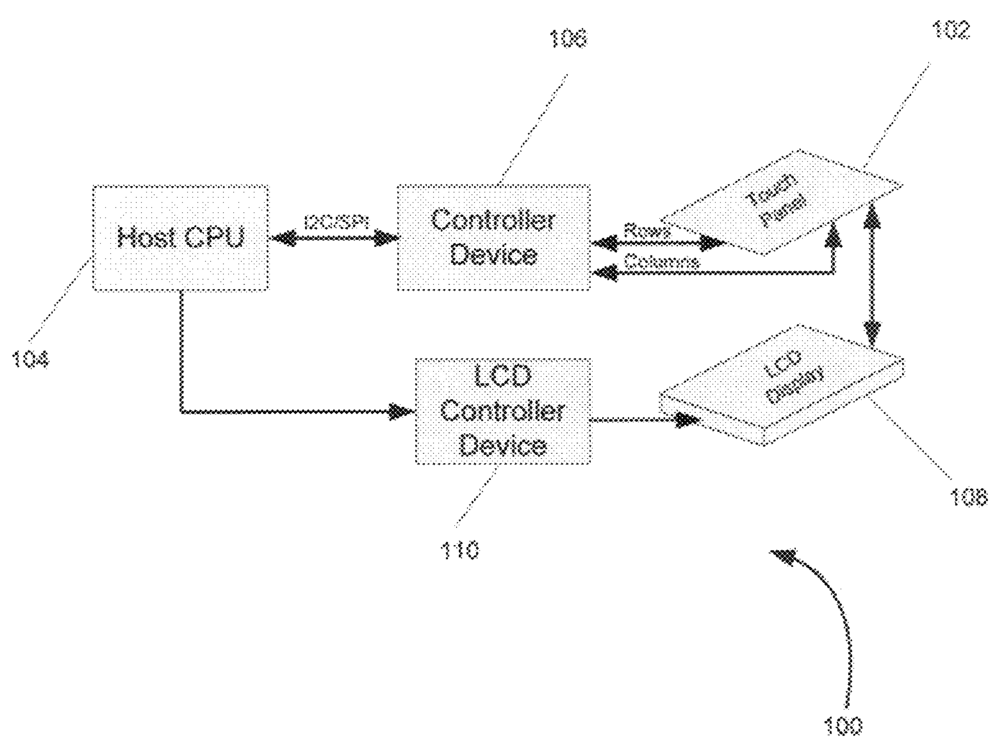
FIG. 1 is a block diagram illustrating an electronic system utilizing a system having a controller device according to embodiments of the present invention.

Systems and methods are provided in the present application for synchronization of touch-panel devices. Specifically, the single master timing signal, known in the present application as a single EXTSYNC signal, is an asynchronous signal which is configured to include information of an event. The event includes but is not restricted to a start event, a reject event and an error event. The start event includes instructions to begin a new phase of conversion during processing of the user using a touch-panel device. The reject event includes instructions to abort conversion during processing of a user using the touch-panel device and return to an initial phase of the conversion. The error event includes instructions to interrupt a conversion during processing of the user using the touch-panel device. The error event is a change in the single asynchronous signal before completion of a phase of the conversion during processing of the user using the touch-panel device. A phase as defined in the present application is a state of a state machine that operates in the master controller device to synchronize operation of multiple controller devices used to control the corresponding portions of the touch-panel device.

In one embodiment, the system includes a single first controller configured to control operations of a first portion of a touch-panel device and also configured to generate a single master timing signal. The single master timing signal is configured to synchronize operation of the first controller device and at least one second controller device. The second controller device is configured to control operations of a second portion of the touch-panel device. The first controller device is further configured to use the single master timing signal to synchronize the operation of the first portion of the touch-panel device and to send the single master timing signal to the second controller device to synchronize the operation of the second portion to the first portion of the touch-panel device. In this embodiment, the first controller device functions as a master chip device and the second controller devices function as a slave chip device.

In one embodiment, the first and the second controller devices are disposed on a single substrate. In another embodiment, the first and the second controller devices are disposed on multiple different substrates.

In one embodiment, any of the controller devices may be configured to operate as a master chip device yet only one of the controller devices are enabled to operate as master chip device and the rest of the controller devices operate as slave chip device.

In one embodiment, the size of the touch-panel device determines the number of controller devices required to control the portions of the touch-panel devices. In one embodiment, a small size touch-panel device requires only one controller device. In another embodiment, a medium size touch-panel device requires at least two controller devices. In yet another embodiment, a large size touch-panel device requires multiple controller devices.

The embodiments described herein provide a synchronization mechanism that is used by a first touch controller device (master chip device) and generates a master timing signal and the second touch controller devices (slave chip devices) to synchronize the operation of different portions of the touch-panel devices.

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

FIG. 1 is a block diagram illustrating an electronic system 100 utilizing an electronic system 100 having a controller device 102 according to embodiments of the present invention. The electronic system 100 includes a host processor 104 in communication with the controller device via an Inter C (I2C) interface; however, other interfaces may be utilized as would be appreciated by one of ordinary skill in the art having the benefit of this disclosure. The electronic system 100 also includes a touch-panel device 106 in communication with the controller device 102. The touch-panel device 106 may be touch phones, sliders, touch pads, touch screens or other sensing devices. The electronic system also includes an LCD display 108 in communication with the touch-panel device 106 and an LCD controller device 110 coupled to the LCD display 108 and to the host processor 104. The LCD controller device 110 functions to control the display on the LCD display 108. The controller device 102 functions to scan and process signals transmitted by the touch-panel device 106.

Figure 2A:
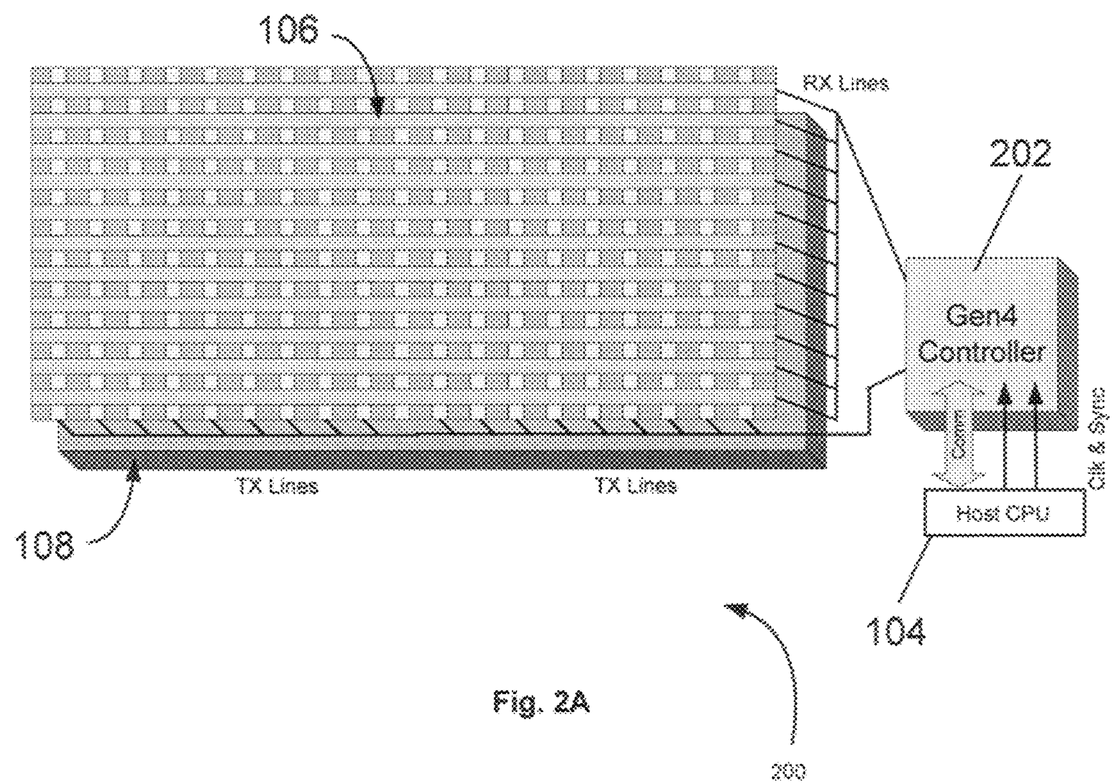
FIG. 2A is a block diagram illustrating an electronic system having a single controller device according to embodiments of the present invention.

FIG. 2A is a block diagram illustrating of an electronic system 200 utilizing integrated circuit 201 having a single controller device 202 of the controller device 102 of FIG. 1 according to embodiments of the present invention. The touch-panel device 106 as illustrated in FIG. 2 is typically one of a touch cell phone device having a generally small size of display thus requiring only the single controller device 202 to scan and process the LCD display 108 on the touch-panel device 106. In such a case, the single controller device 202 will function as a master device.

Figure 2B:
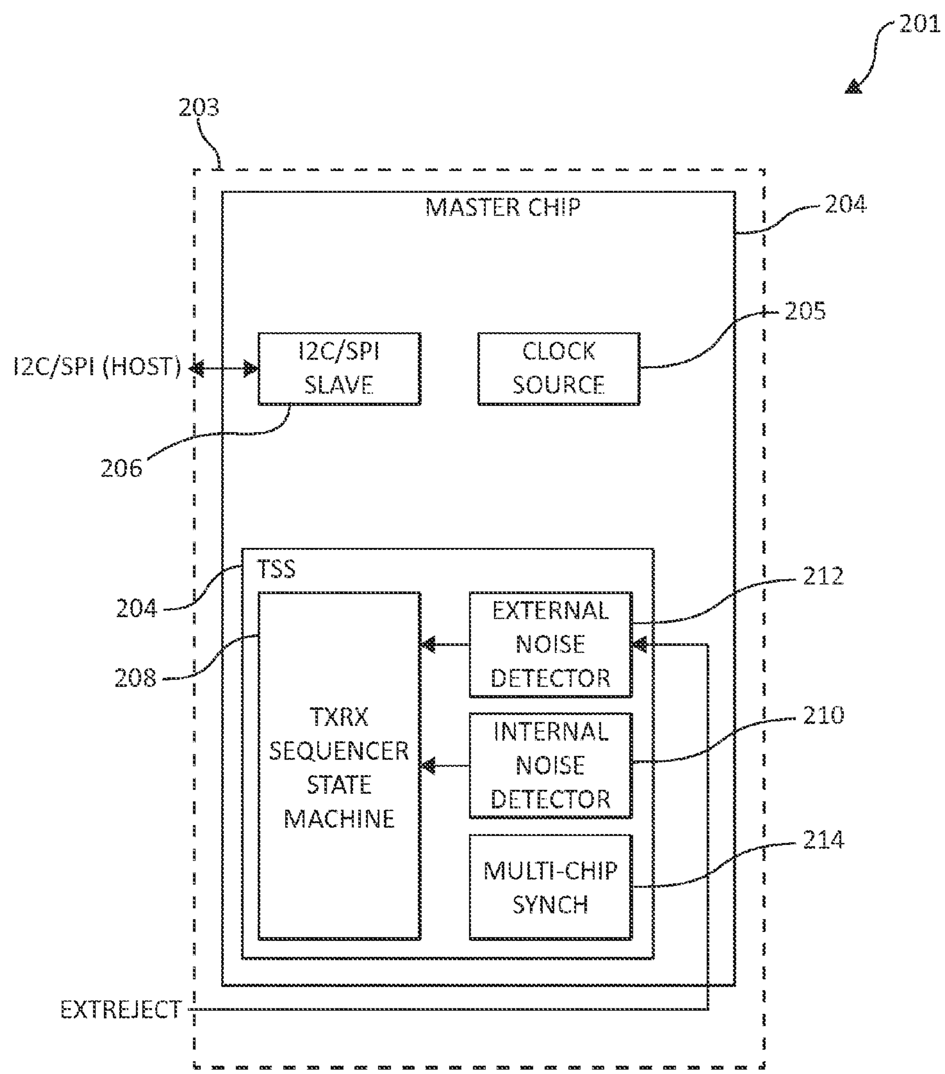
FIG. 2B is a block diagram illustrating the system of FIG. 2A according to an embodiment of the present invention.

FIG. 2B is a block diagram illustrating the integrated circuit 201 of FIG. 2A according to an embodiment of the present invention. The integrated circuit 201 includes a single chip configuration having a single controller device 202 disposed on a substrate 203 of the integrated circuit 201. Although the single controller device 202 is illustrated as disclosed only on a single substrate 203 in FIG. 2B, one of ordinary skill in the art would appreciate that the single controller device 202 may be disposed on multiple different substrates as would be appreciated by one of ordinary skill in the art having the benefit of this disclosure. Broadly stated, the single controller device 202 relies either on its own LCD noise detection or an external noise detection/synchronization input and generates a single asynchronous signal to synchronize operation of itself and other controller devices (not shown), details of which are described herein below.

The single controller device 202 is configured to operate as a master chip device. The main components of the single controller device 202 include touch-panel subsystem (TSS) 204, a clock source 205 and a primary slave 206 which functions as an interface to the rest of the system via an Inter C (I2C) interface or Serial Peripheral Interface (SPI). In one embodiment, the clock source 205 may preferably be an internal main oscillator (IMO), although other clock sources may be utilized as would be appreciated by one of ordinary skill in the art having the benefit of this disclosure. The TSS 204 includes a TXRX sequencer state machine 208 which is a core sequencer that meters out the TX pulses, conversions, sub-conversions, etc. As known in the art, a TX pulse is one period of the analogue voltage square wave output by the Transmit (TX) block to the touchscreen panel. For a conversion, one or more TX pulses can be output to the touchscreen. For each TX pulse, the Receive (RX) block integrates the received charge from the touchscreen panel. The TSS ADC converts the integrated voltage from one or more TX pulses to generate a code representing the accumulated charge (indicating the capacitance) at a given touchscreen intersection. This is referred to as a sub-conversion. A sub-conversion can be made up of one or more TX-pulses. A conversion is a capacitance measurement by the TSS at one intersection on the panel. A conversion is the digital accumulation of multiple sub-conversions. A conversion can be made up of 1 or more sub-conversions.

TXRX sequencer state machine 208 is a configurable state machine with timed and conditional transitions. The TSS 204 also includes an internal noise detector 210 and an external noise detector 212 coupled to the TXRX sequencer state machine 208 and a Multi-Chip Synchronization 114. The internal noise detector 210 retrieves an internal signal such as a raw LCD noise measurement signal from an RX Channel (LX_DETECT) A Receive (RX) channel integrates incoming charge from the panel as a result of a TX waveform output on the panel. When configured in LX (Listen) mode the channel uses a TIA circuit to convert the incoming charge spikes to a voltage. This is compared against programmable voltage thresholds which represent noise thresholds. If the incoming charge (noise charge) exceeds these thresholds LX_DETECT will assert indicating the presence of a noise event on the touch panel. The internal noise detector 210 also functions to execute the LCD noise measurement signal through a pulse qualifier (not shown) that has configurable parameters including polarity, edge/level detect, phase delay, de-bounce parameters, etc. These configurable parameters are also known as the internal parameters. In polarity mode, the signal is considered for the noise detection signal as active-HI or active-LO. In edge detect mode, each posedge (or negedge) on the EXTREJECT signal is interpreted as a noise event, and a configurable length exclusion pulse (Trej-length) is generated and forwarded to the sequencer on the REJECT output. This internal signal is used by the TSS 204 to generate the single EXTSYNC signal which in this case identifies a reject event. The reject event includes instructions to abort the sub-conversions of the single controller device 202 and reset and return to an initial state. In the situation of the abort of the sub-conversions, all the results of the sub-conversions are typically discarded. The initial state may be identified by the single EXTSYNC signal as a start event which includes instructions to begin a new phase of conversion which is used to synchronize a sub-conversion or conversion to the noise detected (i.e. do not start until the 'start' signal asserts). The external noise detector 212 retrieves an external signal preferably from an LCD synchronization signal (not shown) and also functions to execute it through the similar pulse qualifier having the configurable parameters described above. The configurable parameters are also known as the external parameters. This external signal is used by the TSS 204 to generate a single EXTSYNC signal which in this situation again identifies a reject event similar to as described above. It is noted that the EXTSYNC signal is generated in a Universal Digital Block (UDB) (not shown) based on outputs from the TSS 204. The single EXTSYNC signal indicating the reject events is configured to indicate the presence of noise in the system during sensitive periods of sub-conversion. The Multi-chip Synchronization Input 214 further functions to receive the single EXTSYNC signal to use it to control operation of a corresponding portion of the touch-panel device 106.

It is noted that the single controller device 202 resynchronizes on each individual TX charge pulse, so even with mismatched frequencies in the clock source 205; the synchronization will be quite close. Each phase has an associated programmable margin at the end which allows at least the single controller device 202 to settle before the next single EXTSYNC signal is received. This ensures that any mismatch in the clock-cycle of the clock source 205 will not affect the synchronization over the single controller device 202. Thus, the single EXTSYNC signal is configured to operate without the clock source 205.

Figure 3A:
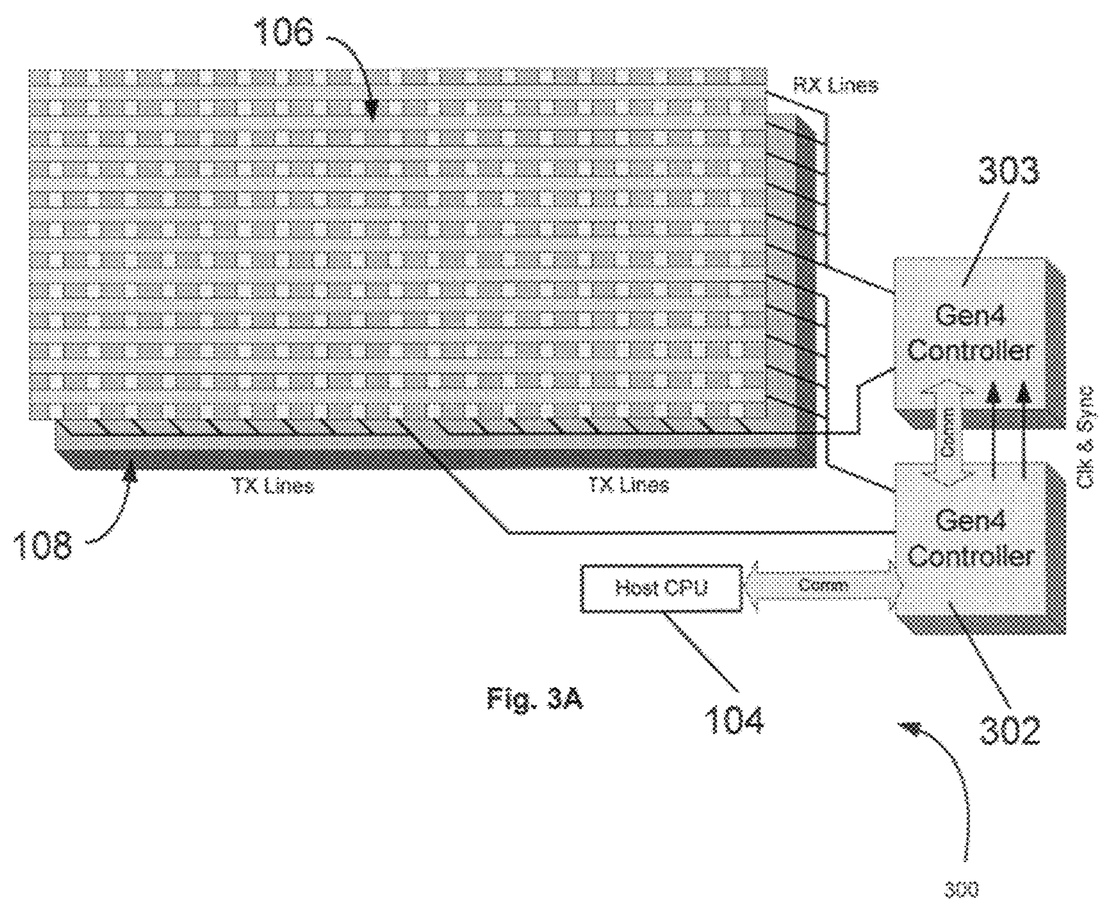
FIG. 3A is a block diagram illustrating an electronic system having two controller devices according to another embodiment of the present invention.

FIG. 3A is a block diagram illustrating an electronic system 300 utilizing integrated circuit 301 having two controller devices, a first controller device 302 and a second controller device 303 of the controller device 102 of FIG. 1 according to embodiments of the present invention. In one embodiment, the touch-panel device 106, as illustrated in FIG. 3A, is a laptop computer or a touch-pad device or other portable device having a larger display, thus requiring more than one controller device to scan and process the LCD display 108 on the touch-panel device 106. In such a case, one of the two controller devices functions as a master device and the other of the two controller devices functions as slave device in a master/slave configuration. In another embodiment, the electronic system 300 may include more than two controller devices as would be appreciated by one of ordinary skill in the art having the benefit of this disclosure.

Figure 3B:
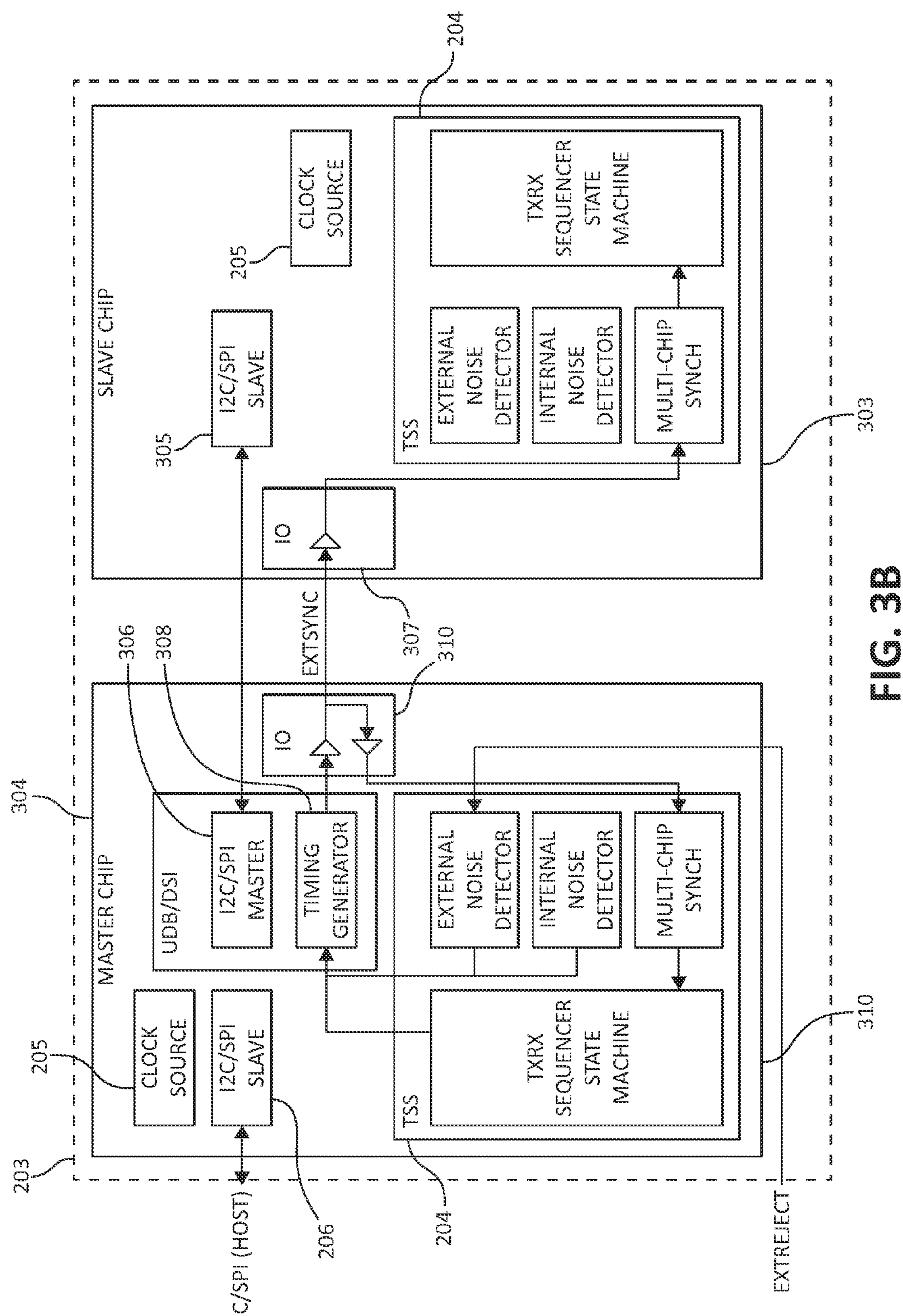
FIG. 3B is a block diagram illustrating the system of FIG. 3A according to another embodiment of the present invention.

FIG. 3B is a block diagram illustrating the integrated circuit 301 of FIG. 3A according to another embodiment of the present invention. The integrated circuit 301 specifically includes a two chip configuration having the first controller device 302 and a second controller device 303 disposed on the substrate 203. Although the first controller device 302 and the second controller device 303 are illustrated as disclosed only on one substrate 203 in FIG. 3B, one of ordinary skill in the art would appreciate that the first controller device 302 and the second controller device may be disposed on multiple different substrates as would be appreciated by one of ordinary skill in the art having the benefit of this disclosure. Broadly stated, the first controller device 302 relies either on its own LCD noise detection or an external noise detection input and generates a single asynchronous signal to synchronize operation of itself and the second controller device 303, details of which are described herein below. The first controller device 302 functions as a master chip device and includes components similar to the single controller device 202 of FIG. 2B. Such components include but not restricted to the primary slave 206, the clock source 205, the TSS 204 having the TXRX sequencer state machine 208, the internal noise detector 210, the external noise detector 212 and the Multi-chip Synchronization Input 214. The first controller device 302 also includes a Universal Digital Block/Digital Signal Interconnect (UDB/DSI) 304 having an Inter C/Serial Periphery Interface (I2C/SPI) Master, i.e. primary master 306 and a timing generator 308 as shown in FIG. 3B. The primary master 306 functions to control the second controller device 303. As known in the art, the Universal Digital Block (UDB_is a block of configurable digital logic. In Multi-Chip sync, the UDB would primarily be used generate the EXTSYNC signal in the Master. The logic would combine the qualified, end of state signal, TXRX state and noise detection signals from the Master Touch Screen Subsystem to generate an EXTSYNC signal. The DSI is configurable interconnect/routing which allows the connection of signals between multiple subsystems on the chip (for example between the TSS and the UDB). The DSI can also be used to route subsystem I/O's to specific pins. I2C/SPI are standard serialized communication buses which function to provide communication between the touch screen chip and the host processor(s).

The timing generator 308 is coupled to the TXRX sequencer state machine 208, the internal noise detector 210 and the external noise detector 212 to receive the signals. The first controller device 302 also includes a first Input/Output device (IO) 310 coupled to receive a signal from the timing generator 308 as illustrated in FIG. 3B. On the first controller device 302 which functions as a Master chip device, the EXTSYNC signal is generated in the UDB/DSI 304, fed out and back through the first I/O device 310 to the TSS 204. This is to match the delay (due to the I/O device 310) of the EXTSYNC signal seen by the first controller 302 with that received by the second controller device 303.

The second controller device 303 functions as a slave chip device and includes components similar to the first controller device 302 of FIG. 1. Such components include but not restricted to the TSS 204 having the TXRX sequencer state machine 208, the internal noise detector 210, the external noise detector 212 and the Multi-chip Synchronization Input 214. The second controller device 303 also includes a secondary Slave 305 and a second Input/Output device (IO) 307 as shown in FIG. 3*b*. It is noted that any one of the controller devices can be configured as a master or slave chip devices and the TXRS sequencer state machine 208 on both master and slave chip devices are always enabled and each is controlled by the EXTSYNC signal. Specifically, the primary master 306 is coupled to the secondary Slave 305 and functions to control the second controller device 303. The first IO 310 of the first controller device 302 is coupled to itself and the second IO 307 of the second controller device and functions to generate a single asynchronous signal, i.e. the single EXTSYNC signal to synchronize operation of the first controller device 302 and the second controller device 303. The single EXTSYNC signal conveys a complex waveform used to keep both the first controller device 302 and the second controller device 303 in synch with one another, i.e. they both transmit and receive at the same time even when LCD noise and other external synchronization/rejection events occur. The single EXTSYNC signal is generated in the UDB/DSI 304 of the first controller device 302 which as mentioned above functions as the master chip device. The UDB/DSI 304 has knowledge of the state of the TXRX sequencer state machine 208 in the first controller device 302. The UDB/DSI 304 also receives a phase-end signal from the TXRX sequencer state machine 208 to indicate that a particular phase has completed. The UDB/DSI 304 then functions to transition the single EXTSYNC signal again to move the TXRX sequencer state machines 208 of the first and the second controller devices 302 and 303 respectively onto the next state. As mentioned above the single EXTSYNC signal is configured to identify at least three events each of such events including instructions generated by the first controller device 302 which are conveyed to itself and the second controller device 303. One such event is a start event which includes to begin a new phase of conversion which is preferably used to synchronize a sub-conversion or conversion (i.e. do not start until the 'start' signal asserts). Additionally, the UDB/DSI 304 can also incorporate the Reject signal both internal and external noise detectors 210 and 212 respectively, as described above with respect to FIG. 2B. The single EXTSYNC signal transitions each time a new state of the touch-panel device is to begin and the single EXTSYNC signal is configured to synchronize the operation of the first and the second controller devices 302 and 303 respectively. The first controller device 302 functions to control operation of a first portion of the touch-panel device 106 and the second controller device 303 functions to control operation of a second portion of the touch-panel device 106. Specifically, as illustrated in FIG. 3B, the multi-chip synchronization input 214 of the first controller device 302 receives the single EXTSYNC signal to use it to control operation of its corresponding portion, a first portion of the touch-panel device 106. Further, the multi-chip synchronization input 214 of the second controller device 303 also receives the same single EXTSYNC signal from the first controller device 302 and uses it to control its corresponding portion, a second portion of the touch-panel device 106.

Figure 6:
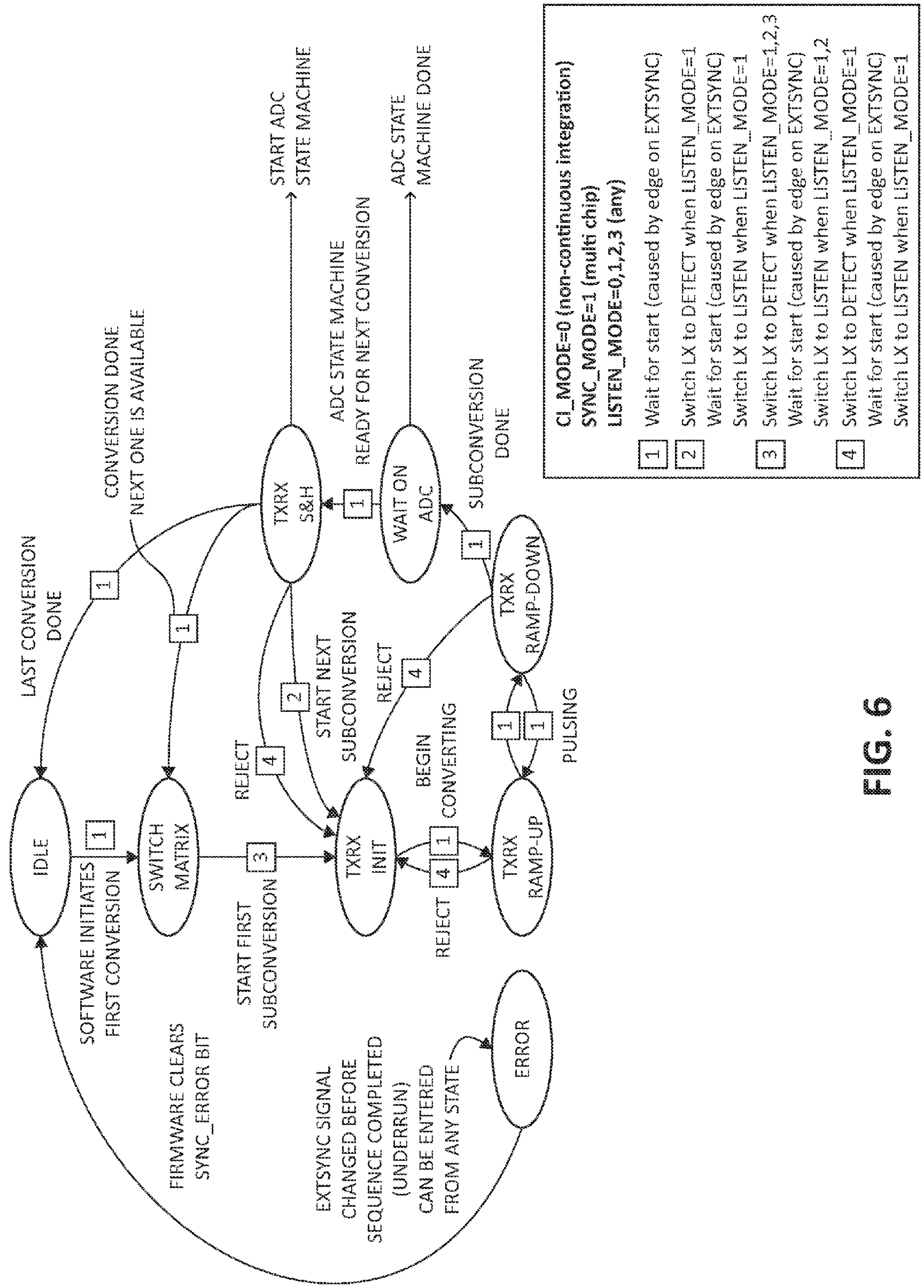
FIG. 6 is a sequence diagram according to an embodiment of the present invention.

Also, the first controller device 302 also functions to use the single EXTSYNC signal to synchronize the operation of the first portion of the touch-panel device 106 and also sends the single EXTSYNC signal to the second controller device 303 to synchronize the operation of the second portion to the first portion of the touch-panel device. As mentioned above, the single EXTSYNC signal is asynchronous. Another event is a reject event which as described includes instructions to abort the sub-conversions and reset and return to an initial state. A third event is an error event which includes instructions to change before a sequence in the TXRX Sequencer state machine 208 is completed. The sequence herein refers to a state in the TXRX state machine. It the EXTSYNC signal transitions "too early" in a given state, the TXRX state machine will interpret this as an error condition and go to an error state. It is noted that the error event can be entered from any state. So, if the TXRX sequencer state machine on both the first controller device 302 and the second controller device 303 are still busy with a sequence and a new edge is already received, it will throw the state machine into the error state. A new edge is a transition on the EXTSYNC signal. This results in a lock up of the TXRX Sequencer state machine 208 until firmware intervention unlocks it. The lock up is the stop/error condition referred above when an early transition occurs on the EXTSYNC signal in any state. The state machine transitions to an ERROR state and will remain there (in lock up) until software clears an interrupt bit. An example of a sequence diagram is illustrated in FIG. 6.

Figure 5:
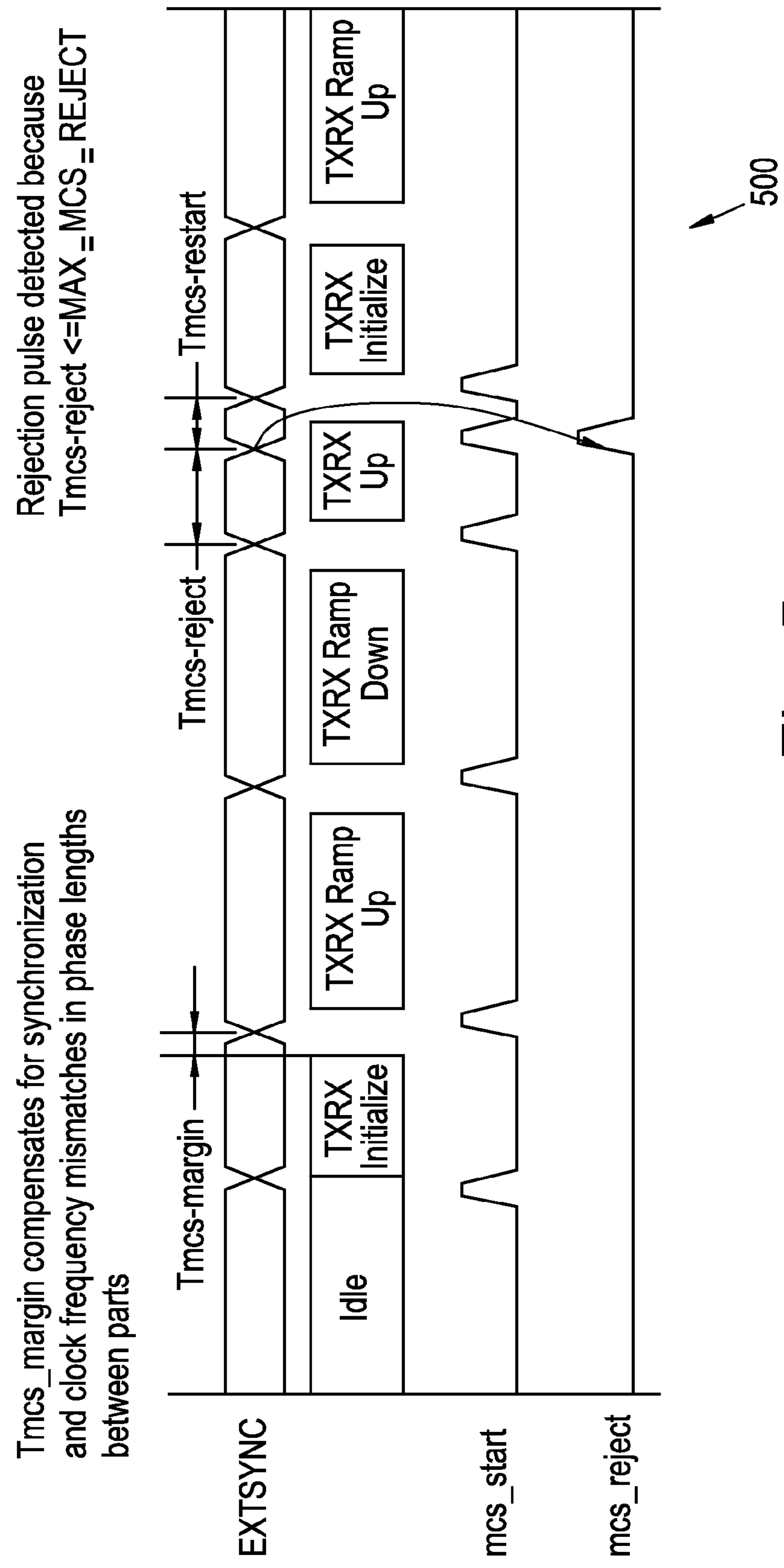
FIG. 5 is a graphical representation of a timing waveform according to an embodiment of the present invention.

The timing generator 308 of the first controller device 302 outputs a timing waveform 500 as illustrated in FIG. 5. The timing generator 308 uses the outputs of the internal and/or external noise detectors 210 and 212 respectively to incorporate sub-conversion rejection and/or synchronization. This timing waveform is sent back into the first controller device 302 and the second controller device 303 via the general purpose input output (GPIO) driver and receiver to create a similar propagation delay on this signal. The timing signal is used by both TSS 204 of the first and the second controller devices 302 and 303 respectively to control operation in lock step. In the lock step each of the controllers' TXRX state machines proceed independently within any given state until they reach a point (the end of each state) where the EXTSYNC signal is again considered before transitioning to the next state which in turn locks the controllers. The first and the second controller devices 302 and 303 resynchronize on each individual TX charge pulse, so even with mismatched frequencies in the clock source 205, the synchronization will be quite close. As illustrated in FIG. 5, each phase has an associated programmable margin at the end which allows the first and the second controller devices 302 and 303 respectively to settle before the next single EXTSYNC signal is received. This ensures that any mismatch in the clock-cycle of the clock source 205 will not affect the synchronization over multiple controller devices. Thus, the single EXTSYNC signal is configured to operate without the clock source 205.

Figure 4A:
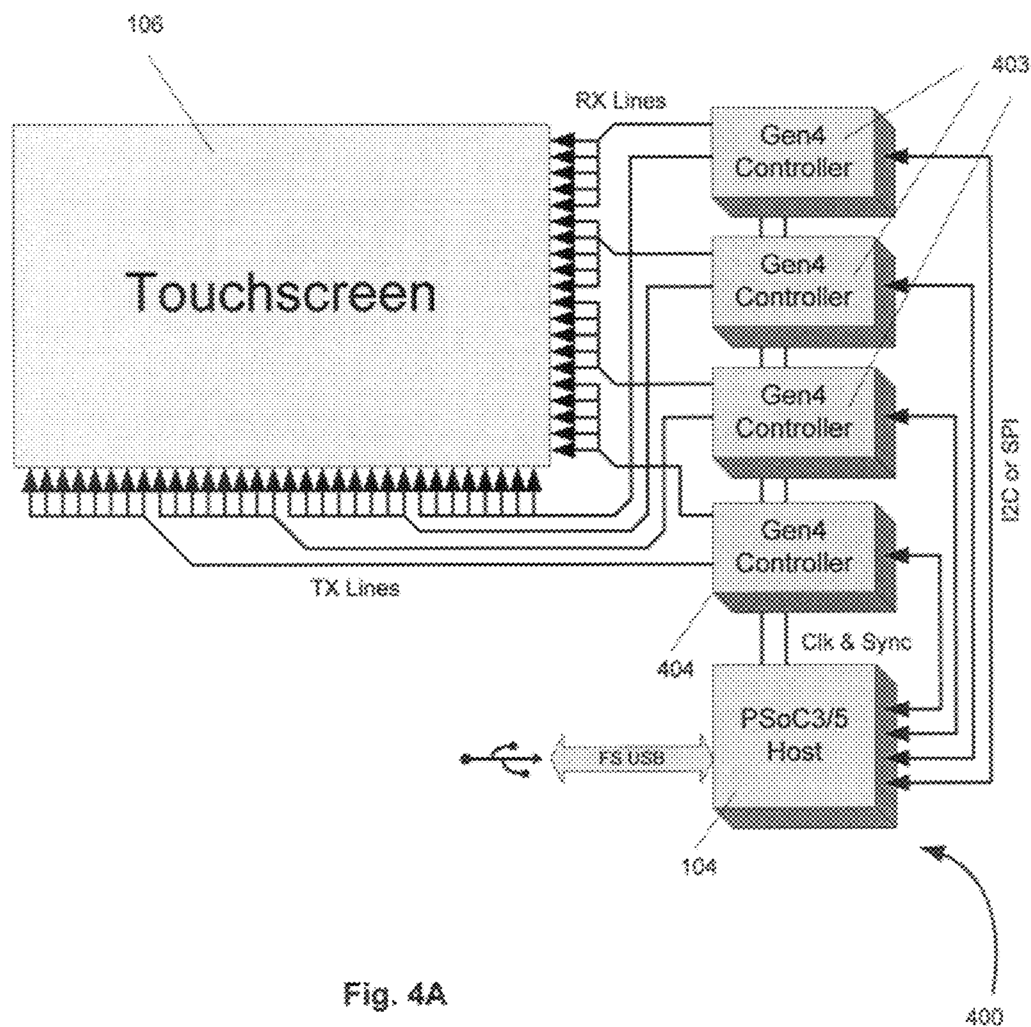
FIG. 4A is a block diagram illustrating an electronic system having multiple controller devices according to another embodiment of the present invention.

FIG. 4A is a block diagram illustrating of an electronic system 400 utilizing integrated circuit 401 having multiple controller devices, a first controller device 402 and multiple secondary controller devices of the controller device 102 of FIG. 1 according to embodiments of the present invention. In this electronic system, there is shown a touch-panel device 106 having very large displays, thus requiring more than one controller device to scan and process the LCD display 108 on the touch-panel device 106. In such a case, the first controller device 402 functions as a master device and the multiple secondary controller devices 403 function as slave devices in a master/slave configuration.

Figure 4B:
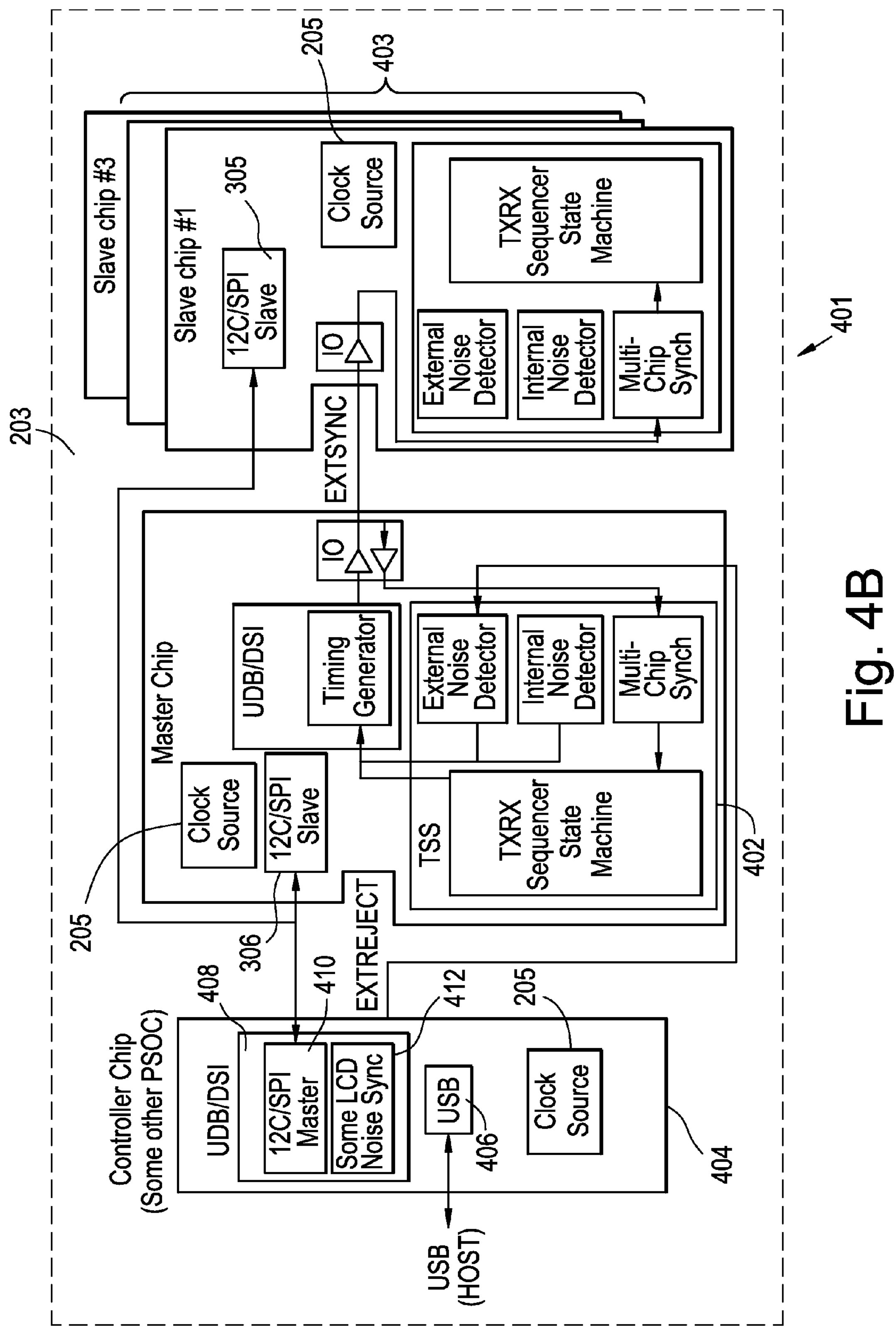
FIG. 4B is a block diagram illustrating the system of FIG. 4A according to another embodiment of the present invention.

FIG. 4B is a block diagram illustrating the integrated circuit 401 of FIG. 4A according to another embodiment of the present invention. The integrated circuit 401 specifically includes a multi-chip configuration having a first controller device 402 and multiple secondary controller devices 403 disposed on the substrate 203 of the integrated circuit 401. In this embodiment, the first controller device 402 includes a multi-chip synchronization component configured to receive the EXTSYNC signal to synchronize the first portion of the touch panel device 106 and multiple secondary controller devices 403 includes a multi-chip synchronization component configured to receive the EXTSYNC signal to synchronize the second portion of the touch panel device 106. Although the first controller device 402 and the multiple secondary controller devices 403 are illustrated as disclosed only on one substrate 203 in FIG. 4B, one of ordinary skill in the art would appreciate that the first controller device 402 and the multiple secondary controller devices 403 may be disposed on multiple different substrates as would be appreciated by one of ordinary skill in the art having the benefit of this disclosure. Broadly stated, the first controller device 402 relies either on its own LCD noise detection or an external noise detection/synchronization input and generates a single asynchronous signal to synchronize operation of itself and the multiple secondary controller devices 403, details of which are described herein below. The first controller device 402 is configured to operate as a master chip device and includes components similar to the first controller device 302 of FIG. 3B. The multiple secondary controller devices 403 function to operate as slave chip devices and include components similar to the second controller device 303. The integrated circuit 401 further includes a controller chip device 404 coupled to the first controller device 402 and the multiple secondary controller devices 403. The controller chip device 404 includes a Universal Serial Bus (USB) interface 406 which functions as the interface to the rest of the system. In contrast to the operation in FIG. 3B, the first controller device 402 no longer controls the multiple secondary controller devices 403 and all are driven by the controller chip device 404. The first controller device 402 only functions as a master chip device in the sense that it creates the timing waveform on which all the multiple secondary controller devices 403 (slave chip devices) synchronize. Specifically, as illustrated in FIG. 4B, the multi-chip synchronization input 214 of the first controller device 302 receives the single EXTSYNC signal to use it to control operation of its corresponding portion, a first portion of the touch-panel device 106. Further, the multi-chip synchronization input 214 of the multiple secondary controller devices 403 also receives the same single EXTSYNC signal from the first controller device 302 and uses it to control its corresponding portion, a second portion of the touch-panel device 106. The controller chip device 404 also includes an UDB/SDI 408 having an I2C/SPI master interface 410 coupled to the primary slave 206 of the first controller device 402 and to the secondary slave 305 of each of the multiple secondary controller devices 403. In this manner, the UDB/SDI 408 is configured to perform pulse qualification on the noise detect signal from the internal or external sources. The UDB/SDI 408 also includes a LCD noise detector/synchronization logic 412. The UDB's can be configured to perform pulse qualification on the noise detect signal from the internal or external sources and interpret the noise detect signal and further use the noise detect signal to synchronize the start of TX Pulses/Sub-Conversions/Conversions. The controller chip device 404 further includes the clock source 205 as described above.

The timing generator 308 of the first controller device 402 outputs a timing waveform 500 as illustrated in FIG. 5. The timing generator 308 uses the outputs of the internal and/or external noise detectors 210 and 212 respectively to incorporate sub-conversion rejection and/or synchronization. This timing waveform is sent back into the first controller device 402 and the multiple secondary controller devices 403 via the general purpose input output (GPIO) driver and receiver to create a similar propagation delay on this signal. The timing signal is used by both TSS 204 of the first and the multiple secondary controller devices 402 and 403 respectively to control operation in lock step. The first and the multiple secondary controller devices 402 and 403 resynchronize on each individual TX charge pulse, so even with mismatched frequencies in the clock source 205, the synchronization will be quite close. As illustrated in FIG. 5, each phase has an associated programmable margin at the end which allows the first and the multiple secondary controller devices 402 and 403 to settle before the next single EXTSYNC signal is received. This ensures that any mismatch in the clock-cycle of the clock source 205 will not affect the synchronization over multiple controller devices. Thus, the single EXTSYNC signal is configured to operate without the clock source 205.

Figure 7:
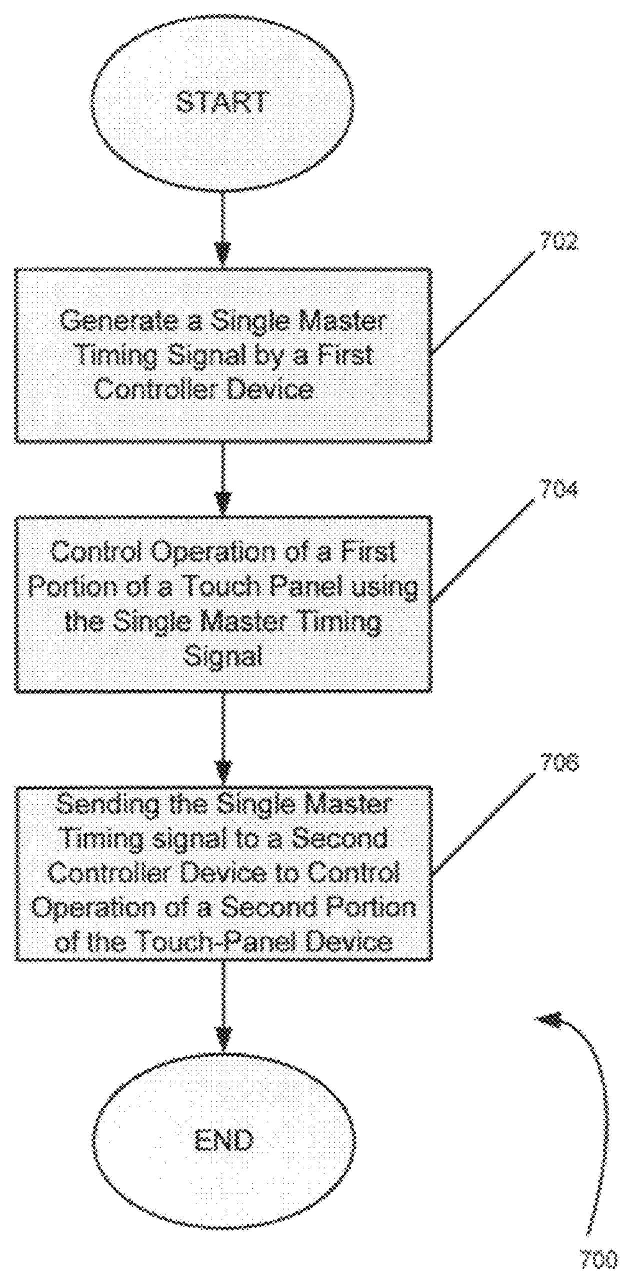
FIG. 7 is a flow chart illustrating a method according to embodiments of the present invention.

FIG. 7 is a flow diagram of one embodiment of a method for synchronization of touch panel devices. Hardware, software or combination of these components may be used to perform method 700. The method 700 starts from block 702 at which the first controller device 302 generates a single master timing signal. At block 704, the first controller device 302 uses the single master timing signal to control the operation of the first portion of the touch-panel device. At block 706, the first master timing signal is sent to the second controller device 303 to control operation of the second portion of the touch-panel device 106. As noted in the above embodiments, the first single master timing signal functions to synchronize the first and the second controller devices 302 and 303 respectively without the clock source 205.

The particular features, structures or characteristics described herein may be combined as suitable in one or more embodiments of the invention. In addition, while the invention has been described in terms of several embodiments, those skilled in the art will recognize that the invention is not limited to the embodiments described. The embodiments of the invention can be practiced with modification and alteration within the scope of the appended claims. The specification and the drawings are thus to be regarded as illustrative instead of limiting on the invention.

We claim:

1. A system, comprising a first controller device configured to control operations of a first portion of a touch-panel device, wherein the first controller device is further configured to generate a single master timing signal provided by a noise detector of the first controller device, wherein the single master timing signal is configured to synchronize operation of the first controller device and a second controller device that is configured to control operations of a second portion of a touch-panel device, and wherein the first controller device is configured to use the single master timing signal to synchronize the operation of the first portion of the touch-panel device and to send the single master timing signal to the second controller device to synchronize the operation of the second portion to the first portion.

2. The system of claim 1 wherein the first controller device is configured to operate as a master device and the second controller device is configured to operate as a slave device in a master/slave configuration.

3. The system of claim 1 wherein the first controller device comprises a clock source, and the single master timing signal is configured to operate independent from the clock source.

4. The system of claim 1 wherein the first and the second controller devices comprise a common clock source and the single master timing signal is configured to operate independent from the common clock source.

5. The system of claim 1 wherein the first controller device and the second controller device are disposed on multiple substrates.

6. The system of claim 1 wherein the single master timing signal comprising information of an event, wherein said event comprise at least one of a start event, a reject event and an error event.

7. The system of claim 6 wherein the start event comprises instructions to begin a new phase of conversion during processing of a user using the touchpanel device.

8. The system of claim 6 wherein the reject event comprises instructions to abort conversion during processing of a user using the touch-panel device and return to an initial phase of the conversion.

9. The system of claim 6 wherein the error event comprises instructions to interrupt a conversion during processing of a user using the touch-panel device, the error event is a change in the single master timing signal before completion of a phase of the conversion.

10. The system of claim 1 wherein the first controller device is configured to receive the single master timing signal from an external noise detector based on an external parameter.

11. The system of claim 1 wherein the first controller device comprises an internal noise detector, wherein the first controller device is configured to receive the single master timing signal from the internal noise detector based on an internal parameter.

12. A computer-implemented method comprising:

generating, by at least a first controller device, a single master timing signal, wherein the single master timing signal is generated by a noise detector of the first controller device;

synchronizing, by at least the first controller device, operation of a first portion of a touch-panel device using the single master timing signal; and synchronizing, by at least a second controller device, operation of a second portion of the touch-panel device using the single master timing signal.

13. The method of claim 12 wherein the synchronizing comprising synchronizing the first and the second controller devices independent of a common clock source.

14. A system, comprising:

a first controller device configured to control operations of a first portion of a touch-panel device, wherein the first controller device is further configured to generate a single master timing signal, the single master timing signal provided by a noise detector of the first controller device, wherein the single master timing signal is configured to synchronize the operations of the first controller device; and a second controller device coupled to the first controller device, wherein the second controller device is configured to control operations of a second portion of the touch-panel device, wherein the first controller device is configured to send the single master timing signal to the second controller device to synchronize the operations of the second portion to the first portion.

15. The system of claim 14, wherein the first controller device comprises a first clock source and the second controller device comprise a second clock source, and the single master timing signal is configured to operate independent from the first and the second clock source.

16. The system of claim 14 wherein the first and the second controller devices comprise a common clock source and the single master timing signal is configured to operate independent from the common clock source.

17. The system of claim 14 wherein the first controller device and the second controller device are disposed on multiple substrates.

18. The system of claim 14 wherein one of the first controller device and the second controller device is configured to receive the single master timing signal from an external noise detector based on an external parameter.

19. The system of claim 14 wherein one of the first controller device and the second controller device comprises an internal noise detector and is configured to receive the single master timing signal from the internal noise detector based on an internal parameter.

20. The system of claim 14 wherein the first controller device comprises a multi-chip synchronization component configured to receive the single master timing signal to synchronize the operations of the first portion of the touch-panel device being controlled by the first controller device and the second controller device comprises a multi-chip synchronization component configured to receive the single master timing signal to synchronize the operations of the second portion of the touch-panel device being controlled by the second controller device.

* * * * *